Nov. 12, 1963   J. B. KENNON   3,110,814
LIGHT RESPONSIVE DEVICE FOR PRODUCING SOUNDS
Filed July 11, 1961   2 Sheets-Sheet 1
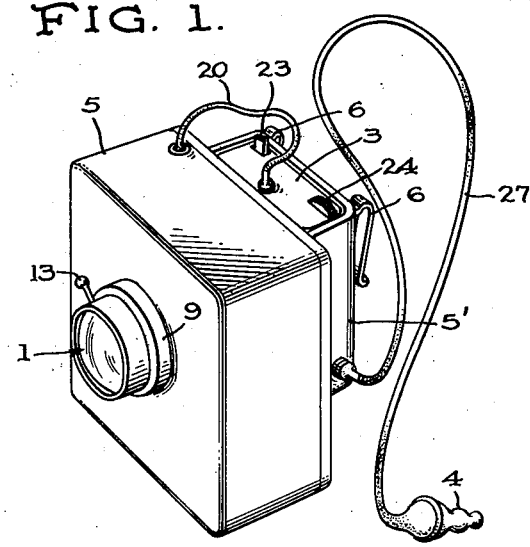
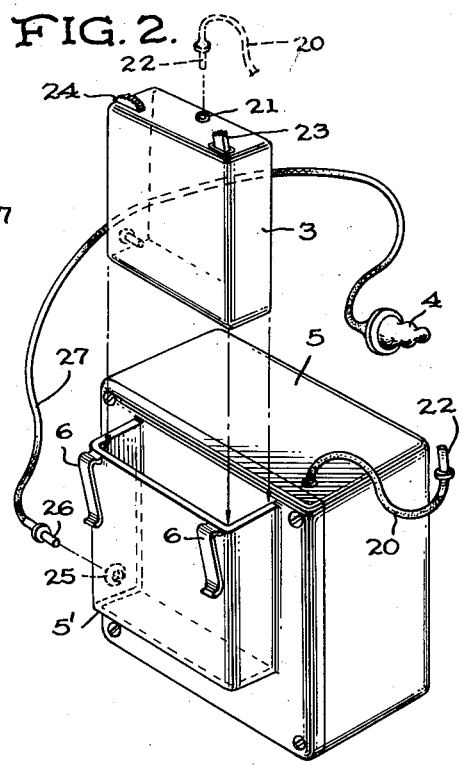
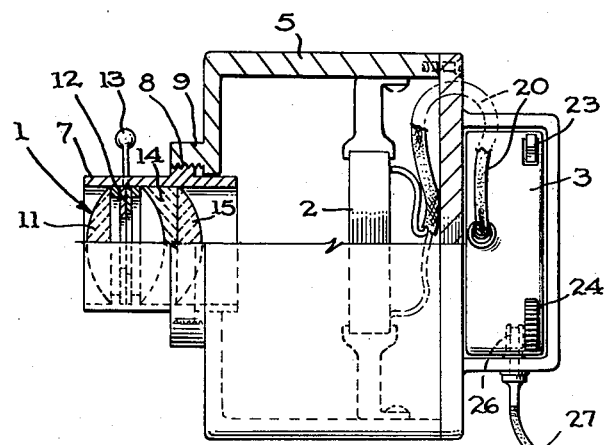
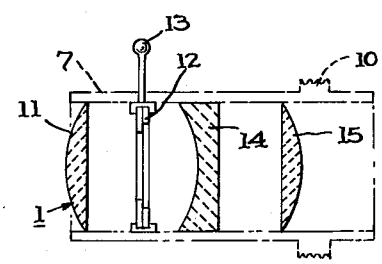
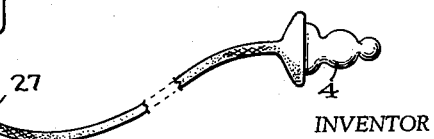
INVENTOR
JOHN B. KENNON
BY
ATTORNEYS Nov. 12, 1963  J. B. KENNON  3,110,814
LIGHT RESPONSIVE DEVICE FOR PRODUCING SOUNDS
Filed July 11, 1961  2 Sheets-Sheet 2
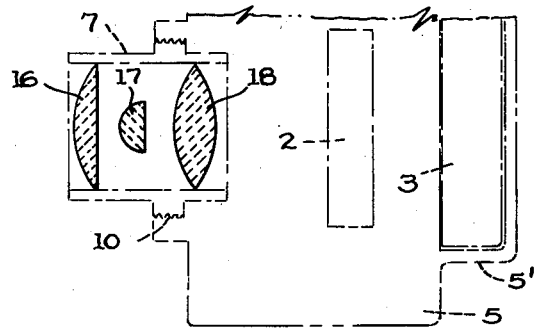
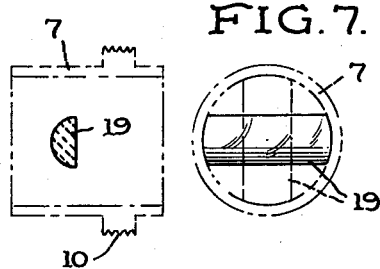
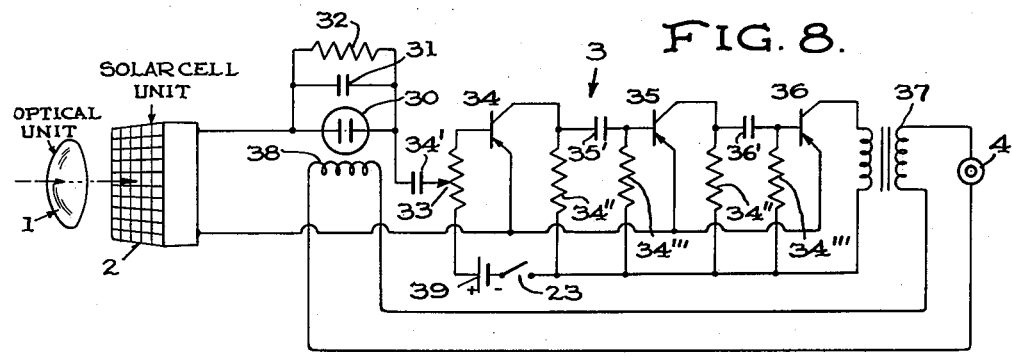
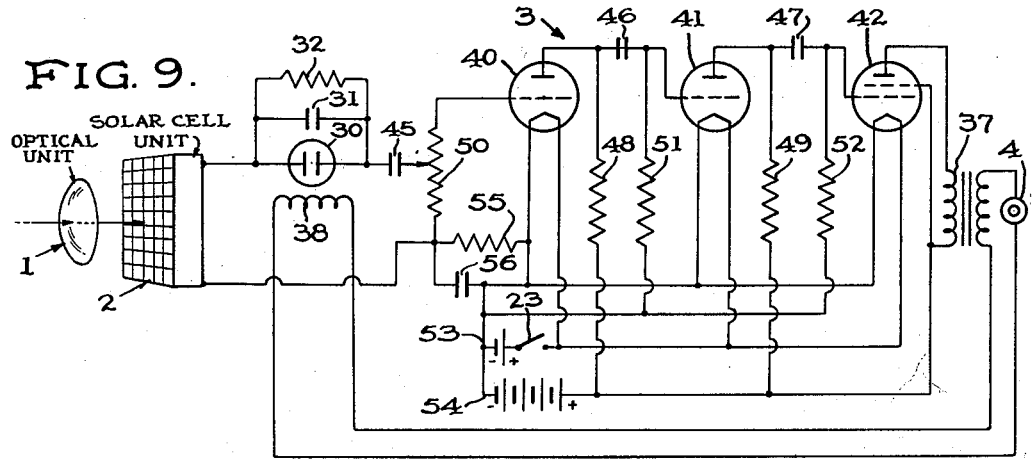
INVENTOR
JOHN B. KENNON
BY
ATTORNEYS

United States Patent Office

3,110,814
Patented Nov. 12, 1963

3,110,814
LIGHT RESPONSIVE DEVICE FOR PRODUCING SOUNDS
John B. Kennon, 330 Gertrude St., Syracuse 3, N.Y., assignor of one-half to Charles E. Wright, Syracuse, N.Y.
Filed July 11, 1961, Ser. No. 123,201
4 Claims. (Cl. 250—214)

The present invention relates to light sensitive devices, and more particularly, to devices for converting light into sound for use in guiding the blind, and/or for general industrial utility such as determining irregularities in rotary objects, indicating the combustion properties of various combustible materials (including gases), and for various other purposes which will become obvious from the following description.

One of the principal objects of this invention is to provide a simple and effective device of a light-weight and readily portable form for use as an aid to the blind, and which will not only serve to guide a blind person in moving about, but which is also capable of use for identifying the nature, location and/or form of various and sundry objects and articles.

I am aware that devices have previously been proposed for use in guiding the blind, but so far as I am aware, none has heretofore achieved success because of the lack of adequate sensitivity, difficulties in interpreting the signals or sounds produced thereby, unpleasantness of the sounds emitted by the former devices and which become intolerable, confusing or misleading, particularly when such devices are in frequent or prolonged use, relative high expense, or combinations of any two or more of these disadvantages or defects.

According to the present invention, I have succeeded in largely eliminating these former defects and disadvantages by avoiding use of so-called tone generators or oscillators such as have heretofore been the basic element of most prior light responsive indicators for the blind. By virtue of such elimination, my improved device requires no rotary or other light interrupters, mechanical scanners, vibrators, or in fact, any moving parts.

In carrying out the purposes and aims of my invention, I preferably utilize an optical unit or system to direct light reflected from an object to a light sensitive element preferably composed of solar energy cells which serve to convert the light imposed thereon into electrical energy, and the electrical output of said solar cells is fed to the input of a modulated amplifier circuit having its output connected with a headphone or other appropriate transducer which serves to emit audible sounds which are characteristic of the reflective or other properties of the original objective to which the optical system and solar cells are responsive.

A further object of my invention is to provide a device of the type described in the preceding paragraph, which may be constructed in miniature form so that it may be readily carried in the hand or may even be worn on the clothing, as by clipping the same to the breast pocket of a shirt or coat, or otherwise fastening the device to an outer garment in such a position as to be pointed ahead of the wearer and thus enable the device to pick up light reflected from the surface on which the wearer is walking at an appropriate distance in advance, and thereby serve to warn the wearer of changes in grade of the path being traversed or of obstructions or other objects in said path. By removing the device from the clothing and holding it in the hand, the user can more easily and quickly aim the device from side to side, and also upwardly and downwardly so as to increase the range of objectives, or to trace the outline of a particular object or article for purposes of identification thereof.

Other and further objects and advantages will be hereinafter described and the novel features thereof defined in the appended claims.

In the drawings:

FIG. 1 is a perspective view of one simple embodiment of my invention as observed from the front and somewhat above the top thereof;

FIG. 2 is another perspective exploded view of the device of FIG. 1, as observed from the rear, and with the amplifier unit removed therefrom and illustrated in perspective in an upwardly displaced position;

FIG. 3 is a view partly in cross-section and partly in side elevation of the device of FIG. 1;

FIG. 4 is an enlarged and more or less diagrammatic detail view of one optical unit or system as utilized in carrying out the objectives of my invention, and generally corresponding to the optical unit illustrated in the assembly of FIG. 3;

FIG. 5 generally corresponds to the assembly of FIG. 3, excepting for the optical unit or system which is modified in this form and the modified optical unit being interchangeable and substituted for the unit illustrated in FIGS. 3 and 4;

FIG. 6 is a cross-sectional view of still another modified interchangeable optical unit having a cylindrical lens;

FIG. 7 illustrates the rotative adjustability of the optical unit of FIG. 6, with the cylindrical lens shown in a horizontal position as depicted in full lines, and in vertical position in broken lines;

FIG. 8 shows the invention in schematic form and embodying a transistor type amplifier; and FIG. 9 generally corresponds to FIG. 8, but embodying an amplifier of the vacuum tube type in lieu of the transistor amplifier of FIG. 8.

Like reference characters designate corresponding parts in the several figures of the drawings. In general, my light responsive device essentially comprises three major elements or components, namely, an optical unit or system generally designated 1, a light sensitive element or unit 2, and an amplifier unit or system 3, the latter being connected with a headphone or earpiece 4 or other appropriate transducer. These major components are preferably assembled and housed in a light-weight readily portable housing or case generally designated 5, which may be suitably attached to the clothing, as by means of appropriate clips 6, 6, or held in the hand during use of the device. The optical system is preferably interchangeable so that optical units of different characteristics may be quickly substituted, one for another, as may be desired under various conditions of use. Three illustrative examples of suitable optical units have been illustrated respectively in FIGS. 4, 5 and 6 of the drawings, but it is to be understood that my invention is not confined thereto.

Referring first to the optical unit which as illustrated in FIGS. 3 and 4, it consists of three lenses suitably mounted in a short metal tube 7, said metal tube being threadedly interconnected as at 8 with the front of the housing or case 5, the latter being provided with an internally threaded connector ring 9 for cooperative engagement with the exterior threads 10 on the tube 7. However, it is to be understood that any other suitable type of connector can be used in lieu of the threaded parts referred to above.

As seen in FIGS. 3 and 4, the front lens 11 is a plano-convex lens, and behind this front lens, there is preferably mounted within the tube 7 an adjustable iris diaphragm 12. An operating arm or lever 13 extended radially from the tube 7 serves to permit adjustment of the iris diaphragm to vary the size of the opening behind the front lens 11. Here again, any other appropriate form of adjustable diaphragm may be employed, as preferred. Behind the iris diaphragm 12, there is mounted in the tube 7 a concave lens 14 and a plano-convex lens 15, the latter having its flat side cemented to the concave lens 14, as more or less diagrammatically illustrated in FIG. 3, but with the lens assembly being shown in FIG. 4 in a somewhat separated condition for the sake of clarity. This particular optical system is intended for general use.

A modified optical unit is shown in FIG. 5 of the drawings, wherein the metal tube 7 has three lenses assembled therein without any aperture or iris diaphragm. The first of these lenses is plano-convex, as indicated at 16, behind which is mounted a semi-cyclindrical lens 17, followed by a double convex lens 18. These lenses are evenly spaced apart within the tube 7 so as to provide a focal length of about 35 mm., which is best suited for distant observations.

Still another modified lens unit is shown in FIGS. 6 and 7, wherein the tube 7 has only one lens 19 of semi-cylindrical form mounted therein, this lens preferably having a focal length of approximately 16 mm. Due to the semi-cylindrical form of the lens 19, it will project a long slit of light, and it is accordingly an advantage to provide for selective adjustment of the position of the lens to either a horizontal position, as shown in full lines in FIG. 7, or a vertical position as shown in dotted lines in this same figure. While the lens unit of FIGS. 6 and 7 is of the fixed focus type, the other lens units previously described may be of any suitable variable focus types such as are commonly used in conventional photographic cameras which are equipped with helically adjustable focusing means. The units of FIGS. 3 and 5 respectively normally cover a range of focal lengths of from about 16 mm. to about 40 mm., which in turn gives an optical range of from about 6 inches to infinity.

Coming now to the light sensitive element designated 2, this element consists of a plurality of silicon solar energy cells which are connected together and sealed in the form of a unitary assembly. This type of light converter is employed in my device because of its high sensitivity and high output which are far superior to those of conventional photo cells and the like. By virtue of the greater sensitivity of the solar energy cells, greater output of electrical energy is achieved even with weak light, thus making possible the use of a much smaller amplifier and power supply, which is particularly important in achieving a small and readily portable device that can be either worn on the clothing or held in the hand when used as an aid to the blind.

The amplifier unit generally designated 3 is suitably connected by a flexible cable 20 to the light sensitive unit 2, and because of the extreme sensitivity of the latter, I am able to use for the amplifier unit conventional hearing aids of either the transistor type or the vacuum tube type, the conventional amplifiers being appropriately modified as will become more fully apparent in the following description. For convenience, and to simplify the assembly of my device, as well as to keep the cost as low as possible, the case or housing 5 of my device may be provided with an extension, as indicated at 5' at the rear thereof, said extension forming a pocket or chamber which is open at the top and into which the amplifier unit 3 may be removably inserted. When the amplifier unit is mounted in the pocket, the connector cable 20 leading from the light sensitive element 2 may be plugged into the top of the amplifier which is preferably provided with a connector socket 21 for receiving a detachable plug 22 provided on the free end of the cable 20. Accessible at the top of the amplifier unit 3 when mounted in the pocket aforesaid, is an on-off switch designated 23 and an adjustable control member 24 which serves to control a variable resistor forming part of the circuit of the amplifier unit 3, as hereinafter described.

In the lower part of one side of the extension 5' of the case or housing 5, there is provided an opening, as indicated at 25 through which a plug 26 may be inserted for connecting the amplifier unit 3 to a flexible cable 27 having an earpiece, headphone or other appropriate transducer suitably connected to the free end thereof. Thus, light directed through the optical unit 1 and imposed upon the light sensitive unit 2 will be converted into electrical energy, which in turn will be converted into audible sounds as amplified by the amplifier unit 3 and reproduced by the earpiece 4.

Referring to the schematic illustration of FIG. 8, it will be noted that when the device is trained onto an objective, the light reflected by the objective passes through the lens unit 1 and falls on the light sensitive element 2, the latter element being connected in series with a small neon tube 30 or other comparable gaseous element, having a fixed condenser 31 and a fixed resistor 32 connected in parallel therewith. These components are connected to the input of the audio amplifier 3, one of the connections leading to a variable resistor 33 which forms a part of the first stage of the amplifier, which in this particular form of my invention is of the transistor type and consists of three PNP type transistors 34, 35 and 36 arranged in a resistance coupled circuitry of the conventional type containing the usual coupling condensers 34', 35' and 36', as well as collector resistors 34" and base resistors 34'''. An output transformer 37 has its secondary connected in series with the earpiece or headphone 4 and with an exciter coil 38 inductively associated with the neon tube 30 as by winding the coil 38 about the latter tube. Power for this circuit is derived from a small battery 39, and the circuit can be turned off or on by switch 23 which completes the circuit illustrated in FIG. 8.

An alternate form of amplifier is shown in FIG. 9, employing vacuum tubes in lieu of transistors. These tubes are of the usual miniature type customarily employed with hearing aids of the vacuum tube type. As shown, the input circuit of the amplifier is substantially the same as in the case of the transistor amplifier described in the foregoing, with the light sensitive element 2 being connected in series with the neon tube 30, about which are shunted a fixed capacitor 31 and a fixed resistor 32. The vacuum tubes 40 and 41 in the first and second stages of the amplifier are of the triode type, while the output tube 42 is a pentode. As in the transistor circuit, the output transformer of the vacuum tube amplifier is connected in series with the headphone or earpiece 4, and with the exciter coil 38 for the neon tube 30. Suitable coupling condensers 45, 46 and 47 are used between the respective stages of the amplifier, and the usual plate resistors 48 and 49, as well as grid resistors 50, 51 and 52 are employed. An "A" battery 53 and a "B" battery 54 supply the power needed to operate the amplifier, and the usual on-off switch 23 is provided to render the amplifier operative or inoperative at will. A biasing resistor 55 and a by-pass condenser 56 of conventional type are also preferably used in the first amplifying stage for the vacuum tube 40 of the circuit illustrated in FIG. 9.

Referring to the transistor circuit of FIG. 8, when light strikes the light sensitive element 2, it is converted to electrical energy which is fed to the input of the amplifier circuit, which in turn produces sound at the earpiece 4 which is arranged in the output of the amplifier, said sound being in the form of a hiss. As the light varies, so will the sound or signal in the earpiece or receiver. A positive signal can only be secured by use of the neon tube 30 and its associated exciter coil 38, which together constitute a modulator. In modulating the signal or sound, the exciter coil 38 produces only a partial ionization in the neon tube 30, thus making the neon tube a very sensitive conductor, with its output being in the nature of a pre-amplifier substantially equivalent to a triode vacuum tube amplifier. The capacitor 31 and resistor 32 form a bias network for the complete input circuit, and at the same time, serves to block out excessive currents and keep them from building up in the neon tube. If the neon tube 30 were over-ionized, it would become insensitive to any input signal and would cause a short circuit in the input circuit.

It is important that the exciter coil 38 be associated with the neon tube 30 so as to have a polarity that will result in production of a positive signal in the earpiece or headphone when the device is in operation, since otherwise, it would be impossible to tell whether the device is properly functioning at any given time.

Operation of the modified form of my device as shown in FIG. 9 is substantially the same as described in the foregoing and will be obvious therefrom.

If the light admitted through the optical unit 1 of the device is reflected from an object having a rough surface, the sound produced in the earpiece or headphone 4 will have a rather "grainy" characteristic, but if the objective or surface reflecting the light is smooth and shiny, the sound will correspond to a very low rumble or hum, but in total darkness, only a very low hiss is heard, and the volume thereof can be controlled by adjusting the variable resistor 33.

In walking about while using my device as an aid to the blind, the device is preferably pointed ahead at approximately a 45° angle, thereby giving a full view of the walkway, the opposite margins of which can be delineated by slowly shifting the aim of the device from side to side. When walking on a concrete sidewalk, the sounds produced by the device will have the characteristics of a "grainy" noise on which are superimposed intermittent clicks resulting from the lines or cracks across the walk. When trained onto a brick surface and moved from side to side and/or upwardly and downwardly, the result is much the same, except that the graininess of the sound is not as coarse as that of a concrete sidewalk, and the clicks are closer together. In the case of stairs, movement of the device upwardly and downwardly while aimed at the stairway causes production of a series of clicks in rapid sequence. By appropriately recognizing and interpreting these distinctive sounds, it is possible after brief training to readily determine the direction, nature and actual identification of various objects and/or articles, each of which produces a characteristic sound pattern. It is also helpful at times to scan the outline of an object or article and thus mentally identify the same from its outline or shape as indicated by the sound pattern, together with other features which can soon be recognized by the user after a brief period of training.

While the specific details have been herein shown and described, my invention is not confined thereto as changes and alterations may be made without departing from the spirit thereof as defined by the appended claims.

I claim:

1. A light responsive device of the class described, comprising a light sensitive element composed of a unitary assembly of solar energy cells having the ability to generate electrical energy responsive to light imposed thereon, an optical system disposed in the light path to the light sensitive element aforesaid for directing light rays to said light sensitive element, miniature electronic amplifier means having its input operatively connected to said light sensitive element, means connected in circuit with the output of said amplifier means for producing signal indications responsive to light directed by the optical system to the light sensitive element, and means for modulating the amplifier input responsive to the signal energy in the amplifier output aforesaid, said modulating means comprising a gaseous element connected in series with the light sensitive element and the amplifier input, and said modulating means including exciter means inductively related to said gaseous element and connected in series with the signal indicator means in the amplifier output for modulating the amplifier energy, said optical system, the light sensitive element, and the amplifier and modulating means being of light-weight construction and arranged in a unitary assembly which may be selectively carried in the hand of the user, suspended from or attached to the clothing of the wearer and supported thereby.

2. A light responsive device as defined in claim 1, wherein the optical system is removably mounted for selective interchange with other optical systems having various optical characteristics.

3. A light responsive device as defined in claim 1, wherein the optical system includes an adjustable iris diaphragm.

4. A light responsive device as defined in claim 1, wherein the modulating means comprises a miniature neon tube connected in parallel circuit with a condenser and a resistor, said parallel circuit being connected in series with the input of the amplifier, and a feedback coil connected in series with the output of the amplifier and inductively related to the neon tube aforesaid.

References Cited in the file of this patent
UNITED STATES PATENTS

| | | |
|---|---|---|
| 1,878,891 | Robinson | Sept. 20, 1932 |
| 2,193,789 | Braselton | Mar. 19, 1940 |
| 2,419,052 | Becker | Apr. 15, 1947 |
| 2,444,235 | Walker | June 29, 1948 |
| 2,919,438 | Deziel | Dec. 29, 1959 |
| 2,951,163 | Shaffer et al. | Aug. 30, 1960 |
| 2,967,940 | Erb et al. | Jan. 10, 1961 |
| 3,017,513 | Messelt | Jan. 16, 1962 |
| 3,023,398 | Siegert | Feb. 27, 1962 |